United States Patent
Biehl et al.

(10) Patent No.: US 11,051,126 B2
(45) Date of Patent: Jun. 29, 2021

(54) SYSTEMS AND METHODS FOR HIGH-ASSURANCE INDOOR PROXIMITY AND LOCATION

(71) Applicant: FUJI XEROX CO., LTD., Tokyo (JP)

(72) Inventors: Jacob Biehl, San Jose, CA (US); Adam Joseph Lee, Pittsburgh, PA (US); Gerald Filby, San Francisco, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 41 days.

(21) Appl. No.: 15/584,055

(22) Filed: May 2, 2017

(65) Prior Publication Data

US 2018/0324547 A1    Nov. 8, 2018

(51) Int. Cl.
| | |
|---|---|
| *H04W 4/02* | (2018.01) |
| *H04B 17/318* | (2015.01) |
| *H04L 9/32* | (2006.01) |
| *H04W 4/33* | (2018.01) |
| *H04L 29/06* | (2006.01) |
| *H04W 12/61* | (2021.01) |
| *H04W 12/63* | (2021.01) |

(Continued)

(52) U.S. Cl.
CPC .......... *H04W 4/023* (2013.01); *H04B 17/318* (2015.01); *H04L 9/3247* (2013.01); *H04L 63/0823* (2013.01); *H04W 4/33* (2018.02); *H04W 12/104* (2021.01); *H04W 12/61* (2021.01); *H04W 12/63* (2021.01); *H04L 63/0442* (2013.01); *H04L 2209/80* (2013.01); *H04W 4/02* (2013.01); *H04W 4/027* (2013.01); *H04W 4/029* (2018.02); *H04W 4/80* (2018.02)

(58) Field of Classification Search
CPC ....... H04W 4/023; H04W 4/80; H04W 4/027; H04B 17/318; H04L 9/30; H04L 9/3247; H04L 43/0864; H04L 63/0442; H04L 2209/80

See application file for complete search history.

(56) References Cited

U.S. PATENT DOCUMENTS

| | | | |
|---|---|---|---|
| 10,117,051 B2 * | 10/2018 | Banavar | H04W 4/021 |
| 2013/0029685 A1 * | 1/2013 | Moshfeghi | G01S 19/48 455/456.1 |

(Continued)

OTHER PUBLICATIONS

Ville Miekk-oja. Thesis submitted for examination for the degree of master of science in technology. "Static beacons based indoor positioning method for improving room-level accuracy" (Year: 2015).*

(Continued)

*Primary Examiner* — Eleni A Shiferaw
*Assistant Examiner* — Bassam A Noaman
(74) *Attorney, Agent, or Firm* — Procopio, Cory, Hargreaves & Savitch LLP (57) ABSTRACT

This disclosure focuses on providing a technology framework for creating secure, location-based applications. The disclosure details a technology solution that can allow users to access secure information on commodity computation devices (e.g., tablets and smartphones) without a heavy (Continued)

infrastructure burden. The technology consists of a collection of software services that run on end-user devices, services on network accessible servers (e.g., cloud), and a specialized device that provides high-assurance location services atop a tamper resistant, trusted computation platform.

19 Claims, 7 Drawing Sheets

(51) Int. Cl.
  *H04W 12/104*  (2021.01)
  *H04W 4/80*  (2018.01)
  *H04W 4/029*  (2018.01)

(56) References Cited

U.S. PATENT DOCUMENTS

| | | | | |
|---|---|---|---|---|
| 2013/0079033 A1* | 3/2013 | Gupta | ........ | H04W 64/00 455/456.2 |
| 2013/0282438 A1* | 10/2013 | Hunter | ........ | H04W 4/029 705/7.32 |
| 2016/0302044 A1* | 10/2016 | Bottazzi | ........ | H04W 4/04 |
| 2016/0327629 A1* | 11/2016 | Pandharipande | ..... | G01S 5/0236 |
| 2018/0071029 A1* | 3/2018 | Srimohanarajah | ..... | A61B 46/10 |

OTHER PUBLICATIONS

Bogdan Carbunar, Radu Sion, Rahul Potharaju, and Moussa Ehsan. Private badges in geosocial networks. In Applied Cryptography and Network Security (ACNS) 2012.

Yih-Chun Hu, Adrian Perrig, David B. Johnson. Packet Leashes: A Defense against Wormhole Attacks in Wireless Networks. INFOCOM 2003.

Iasonas Polakis, Stamatis Volanis, Elias Athanasopoulos, and Evangelos P. Markatos. The man who was there: Validating check-ins in location-based services. In Proceedings of the 29th Annual Computer Security Applications Conference, ACSAC '13.

Jacob T. Biehl, Adam J. Lee, Gerry Filby, and Matthew Cooper. 2015. You're where? prove it!: towards trusted indoor location estimation of mobile devices. In Proceedings of the 2015 ACM International Joint Conference on Pervasive and Ubiquitous Computing. ACM, New York, NY, USA, 909-919. DOI: http://dx.doi.org/10.1145/2750858.2804284.

* cited by examiner

SYSTEMS AND METHODS FOR HIGH-ASSURANCE INDOOR PROXIMITY AND LOCATION

BACKGROUND OF THE INVENTION

Technical Field

The disclosed embodiments relate in general to positioning systems and, more specifically, to systems and methods for high-assurance indoor proximity and location.

Description of the Related Art

A long-standing problem in the art has been fast and accurate determination of indoor location. A variety of hardware and software techniques have been created and, especially in recent years, solutions have been proposed that are both reliable and easy to deploy. Many of these technologies enable everyday devices like smartphones and tablets to determine their indoor position. In fact, technologies like APPLE®'s iBEACON framework are beginning to see large adoption, deployment, and use. As a result, a technology foundation is being laid for an explosion of indoor location-enabled applications.

For a broad class of applications, accurate location information provides context to assist or enhance the user's experience. These include points of interest applications, mapping tools, and social presence sharing applications. While an inaccurate or manipulated location would impact the usefulness of these applications, it would not be harmful from the perspective of the service provider. However, there are many other applications in which the accuracy and trustworthiness of the location is integral to the application itself. These include room access, inventory control, and document access solutions whose decisions to permit or deny access to physical or virtual objects have a contextual dimension that includes the user's physical location.

There has been a significant amount of past research and development that has focused on trusted localization. However, much of this work has explored point solutions. For instance, solutions have been developed to provide anonymous but verifiable location check-ins for location-based services, context-based proofs of compresence that piggyback on existing infrastructure, and systems for creating and verifying secure proofs of (coarse) location in multi-stakeholder WIFI® or cellular environments. U.S. Pat. No. 9,491,588, incorporated herein by reference, describes a solution that affords a certain degree of location assurance using a novel protocol that encodes location and time information into a BLE (BLUETOOTH® low energy) beacon-based location framework. The protocol protects against replay attacks, but is still susceptible to attacks in which two or more users collude to produce a location proof for some user that differs from that user's physical location.

Therefore, as would be appreciated by persons of ordinary skill in the art, new and improved systems and methods for high-assurance indoor proximity and location are highly desirable.

SUMMARY OF THE INVENTION

The embodiments described herein are directed to methods and systems that substantially obviate one or more of the above and other problems associated with conventional localization techniques.

In accordance with one aspect of the inventive concepts described herein, there is provided a computer-implemented method, the method being performed in a computerized system incorporating a central processing unit, a localization signal receiver and a memory, the computer-implemented method involving: receiving at least one localization signal using the localization signal receiver; measuring a strength of the received localization signal; determining whether the computerized system is co-located with an anchor device; and if the computerized system is determined to be co-located with the anchor device, determining a location based at least on the measured strength of the received localization signal.

In one or more embodiments, determining whether the computerized system is co-located with the anchor device involves receiving a first message including a key from the anchor device; transmitting a second message including at least the received key back to the anchor device; and analyzing, at the anchor device, a timing of the first message in relation to a timing of the second message.

In one or more embodiments, the computerized system is determined to be co-located with the anchor device if a time lapsed between the first message and the second message does not exceed a predetermined threshold.

In one or more embodiments, the key is a randomly generated nonce.

In one or more embodiments, the second message is signed using a private cryptographic key associated with the computerized system and wherein the anchor device validates the second message using a public key associated with the computerized system.

In one or more embodiments, receiving the first message and transmitting the second message are performed via a near field communication (NFC) protocol.

In one or more embodiments, the second message further includes the measured strength of the received localization signal.

In one or more embodiments, the anchor device transmits a third message to a server, the third message including at least the second message and a location proof of the anchor device.

In one or more embodiments, the third message is signed using a private cryptographic key associated with the anchor device and wherein the server validates the third message using a public key associated with the anchor device.

In one or more embodiments, the key is unique.

In one or more embodiments, the received localization signal is provided by a beacon disposed in a room of a building.

In one or more embodiments, the anchor device is a trusted device including a trusted execution environment.

In one or more embodiments, determining a location based at least on the measured strength of the received localization signal is performed on a server and wherein the server is configured to transmit a location proof to the computerized system.

In one or more embodiments, the location proof is transmitted to the computerized system via the anchor device.

In one or more embodiments, the computerized system executes a user application and wherein the location proof is provided to the user application.

In one or more embodiments, the method further involves anchoring the anchor device.

In one or more embodiments, anchoring the anchor device involves receiving, at the anchor device, at least one second localization signal; measuring a strength of the received second localization signal; and determining a location of the anchor device based at least on the measured strength of the received localization signal.

In one or more embodiments, the determining a location of the anchor device based at least on the measured strength of the received second localization signal is performed on a server and wherein the server is configured to transmit a location proof to the anchor device.

In one or more embodiments, the method further involves detecting a motion of the anchor device and invalidating the location proof of the anchor device based on the detected motion.

In one or more embodiments, the anchor device incorporates an accelerometer and wherein the motion of the anchor device is detected using the accelerometer.

In one or more embodiments, the location proof of the anchor device is invalidated when the detected motion exceeds a predetermined threshold.

In one or more embodiments, determining whether the computerized system is co-located with an anchor device is performed periodically.

In accordance with another aspect of the inventive concepts described herein, there is provided a non-transitory computer-readable medium embodying a set of computer-executable instructions, which, when executed in connection with a computerized system incorporating a central processing unit, a localization signal receiver, a display and a memory, cause the computerized system to perform a method involving: receiving at least one localization signal using the localization signal receiver; measuring a strength of the received localization signal; determining whether the computerized system is co-located with an anchor device; and if the computerized system is determined to be co-located with the anchor device, determining a location based at least on the measured strength of the received localization signal.

In accordance with yet another aspect of the inventive concepts described herein, there is provided a computerized system incorporating a central processing unit, a localization signal receiver and a memory, the memory storing a set of computer-readable instructions causing the computerized system to perform a method involving: receiving at least one localization signal using the localization signal receiver; measuring a strength of the received localization signal; determining whether the computerized system is co-located with an anchor device; and if the computerized system is determined to be co-located with the anchor device, determining a location based at least on the measured strength of the received localization signal.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive concepts. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

The below description focuses on providing a technology framework for creating secure, location-based applications. To address the above and other problems associated with the conventional technology, one or more embodiments described herein implement a system and method for performing high assurance proofs of proximity and location that requires significantly less infrastructure burden compared to previously proposed methods. In one or more embodiments, to achieve the aforesaid goal of performing high assurance proofs of proximity and location, there is provided a set of protocols and a specialized hardware device that leverage secure localization technologies with new cryptographic techniques to assert a device, or set of devices, are at, and stay at, a specific indoor location. In various embodiments, this technology can be used to support several secure location applications, such as secure document access.

In one or more embodiments, there is provided a technology solution that can allow users to access secure information on commodity computation devices (e.g., tablets and smartphones) without a heavy infrastructure burden. In various embodiments, the described technology consists of a collection of software services that run on end-user devices, services on network accessible servers (e.g., cloud), and a specialized device that provides high-assurance location services atop a tamper resistant, trusted computation platform.

To illustrate the need for the described technology, consider the simple case of location-based document access. For instance, specifying that an electronic document is only viewable when the viewing device is in a specific physical space (e.g., a particular conference room in an office building.) This application must leverage underlying location technologies that have the accuracy and precision to localize the device in the appropriate room, and must be trustworthy in that determination. For commodity, off-the-shelf devices this assertion is difficult to provide. The device itself is not a trusted computation platform, nor are the sensors and/or network used to capture and transmit information used to perform a location determination.

The embodiments described herein provide greater assurances on the location estimation and the computational infrastructure that is used to sense, compute, and replay this estimation. While there are infrastructure-heavy solutions to high-assurance device localization (e.g., as described in the previous invention), the described techniques provide a lightweight and flexible solution to this problem that is capable of supporting a wide range of high assurance applications.

High Assurance Localization System Architecture

Figure 1:
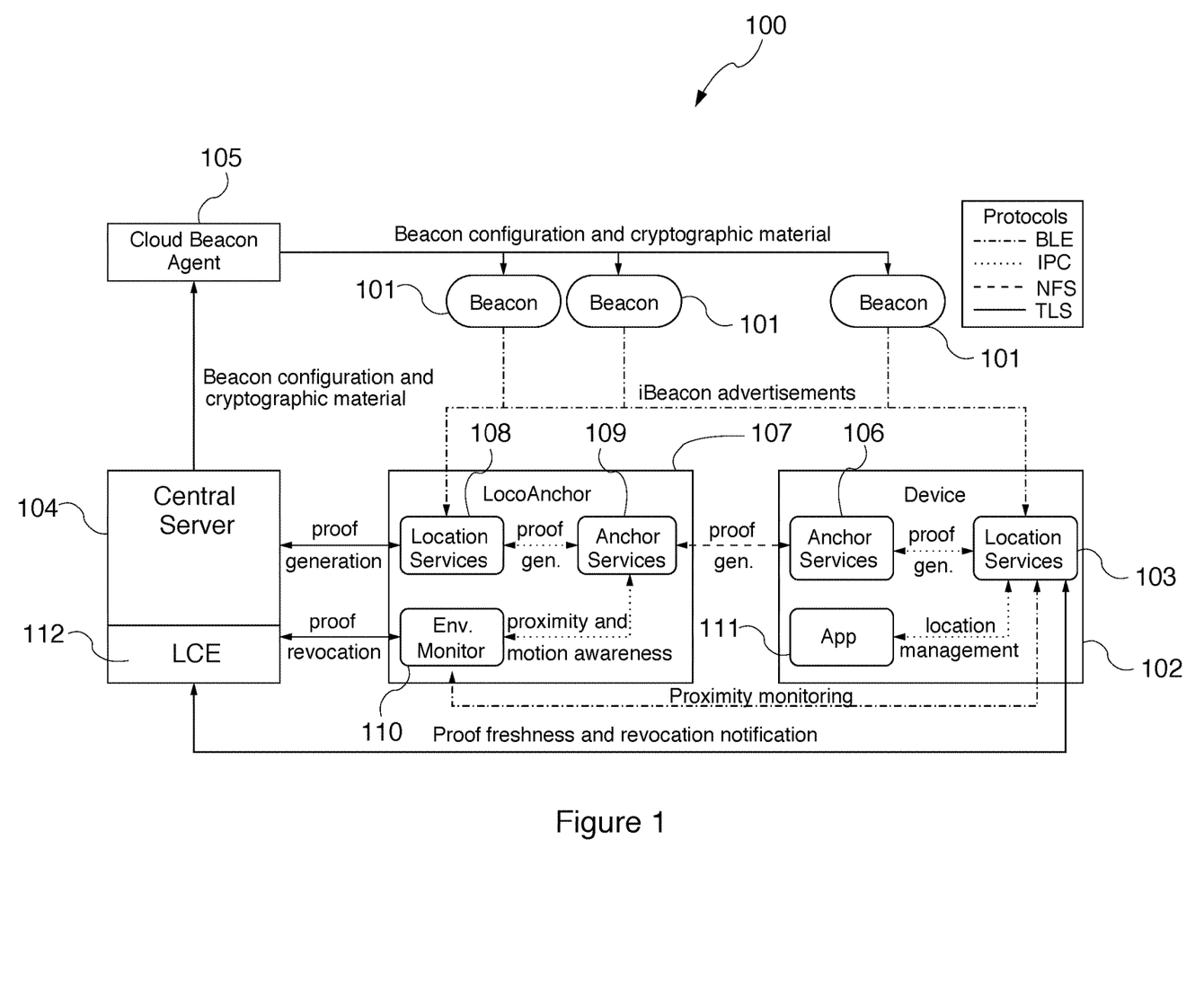
FIG. 1 illustrates an exemplary logical diagram of an embodiment of a high assurance localization system described herein.

FIG. 1 illustrates an exemplary logical, diagram of an embodiment of a high assurance localization system 100 described herein. In one exemplary embodiment, the high assurance localization system 100 incorporates several components, including: a deployment of multiple cloud connected beacons 101, a cloud beacon agent (CBA) 105, a central server 104, a location classification engine (LCE) 112, executing on the central server 104, and a client device 102. The client device 102 runs both client location services 103 and client anchor services 106. Finally, the high assurance localization system 100 incorporates a specialized device, called an anchor device 107. The anchor device 107 executes location services 108, anchor services 109 and environmental services 110. Each of the above components of the high assurance localization system 100 will be described in detail below. In one or more embodiments, the client device 102 may additionally execute a client application 111.

Cloud-Connected Secure Beacons 101

In one or more embodiments of the high assurance localization system described herein location estimates are determined through the collection of signal strength measurements from a plurality of fixed beaconing devices 101, shown in FIG. 1. While measurements from a variety of radios can be used, an embodiment of the described system 100 relies on BLUETOOTH® Low Energy devices, well known to persons of ordinary skill in the art, to maintain compatibility across a wide-range of existing devices. It should be noted, however, that other types of beaconing devices 101 may be used to facilitate location estimation and, therefore, the described system is not limited to any specific type or types of beaconing devices.

Figure 2:
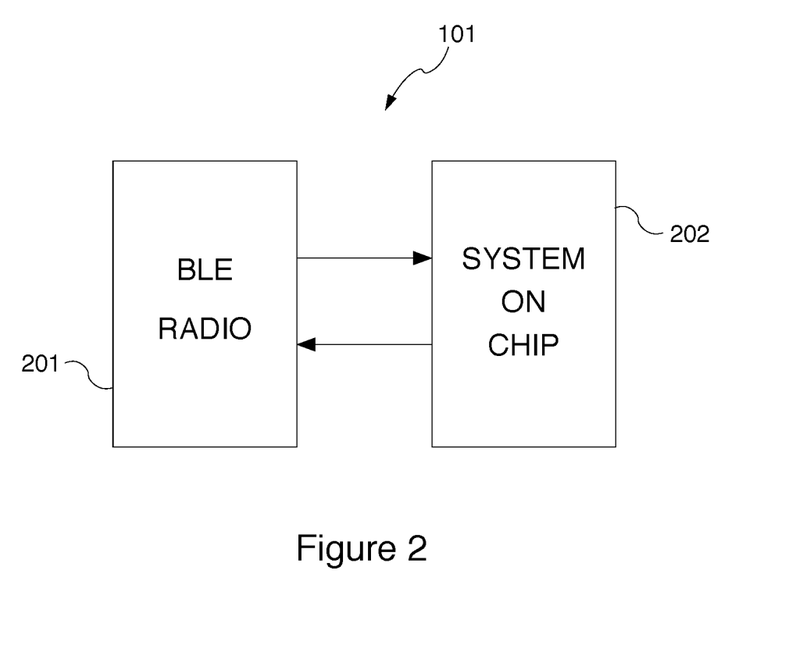
FIG. 2 illustrates an exemplary embodiment of a secure beacon.

FIG. 2 illustrates an exemplary embodiment of a secure beacon 101 that is comprised of two hardware components—a BLUETOOTH® Low Energy (BLE) radio 201 and a WIFI® enabled system on a chip (SoC) 202. In one or more embodiments, the SoC 202 communicates securely with a cloud based runtime engine (the Cloud Beacon agent (CBA) 105 (FIG. 1)) that allows its software and functionality to be updated at regular intervals. The SoC 202 device also controls the state of the BLUETOOTH® radio 201 through an ICT bus connection. In one exemplary embodiment, the beacon device 101 is powered by four AA 1.5V batteries that are power regulated to 3V output. Under normal use, this should power the beacon for at least a year.

In one or more embodiments of the localization system 100 described herein, the cloud beacon 101 operates in two modes: beacon mode and update mode. In the beacon mode, the system on a chip 202 is placed into sleep state and the BLUETOOTH® radio 201 is programmed to wake regularly (for example every 2000 ms) to transmit an iBEACON® compatible advertisement. In one embodiment, this advertisement contains three main segments: a UUID that associates the device to specific services or capabilities, major ID, and minor ID. The UUID is used to identify the beacon 101 as a beacon of the localization system 100. The major ID is used to uniquely identify each beacon 101. This ID is used by the location classification engine 103 along with the received signal strength of the beacon 101 to determine a device's location. In one embodiment, the classification engine 103 uses the major IDs of the beacons to classify the room-level location of the device.

Finally, the minor ID is used to provide cryptographic material used by the location authority, described in further detail below. The main function of the connected beacon is to be able to set and control the minor ID value to correctly transmit the cryptographic key used by the location authority. The classification engine 112 uses the minor IDs of the beacons to ensure the freshness of the advertisements to guard against replay or spoofing attacks.

In one or more embodiments, in the update mode, which occurs at fixed, but configurable intervals, the WIFI system on a chip (SoC) 202 connects to the CBA 105 to download new beaconing assignments. These include Minor ID based on a new cryptographic key, or new UUID/Major assignments to invalidate and reconfigure the overall location infrastructure. In this state, all the parameters of the iBEACON® advertisement can be updated. When the beacon 101 is deployed, this operation normally configures a new minor ID which is a new unique key provided by the location authority.

Location Classification Engine (LCE)

In one embodiment, the LCE provides a landmark-based location classification, well known in the art. In another embodiment, the LCE implements location estimation techniques that provide coordinate based location (X,Y,e) (either by using heuristics based on distance rather than location context, or through the projection of a coordinate location onto a map ontology to determine a landmark location).

In one or more embodiments, the location classification techniques utilized by the described system, are based on the ensemble learning method of boosting described, for example, in Freund, Y., Schapire, R.: A decision-theoretic generalization of on-line learning and an application to boosting. Journal of Computer and System Sciences 55(1), 119-139 (1997) and 11. Hastie, T., Tibshirani, R., Friedman, J., The Elements of Statistical Learning, Springer, New York, 2001. In contrast to more common matching methods such as described in Bolliger, P. Redpin—adaptive, zero-configuration indoor localization through user collaboration. In Proceedings of the ACM international workshop on Mobile entity localization and tracking in GPS-less environments, (MELT 2008), pp. 55-60, boosting provides similar classification accuracy without requiring the storage of a search data structure that grows with the training set size. Further, boosting performs most of the computation in offline training, allowing for classification runtime performance to be orders of magnitude faster compared to matching approaches, see for example Biehl, J. T., Cooper, M., Filby, G., Kratz, S. LoCo: A Ready-to-Deploy Framework for Efficient Room Localization using Wi-Fi. In Proceedings of the ACM Conference on Ubiquitous Computing (Ubicomp 2014).

In one or more embodiments, the location classification engines 103 and/or 108 seek to provide location relative to a discrete spatial quantization, or more generally rooms (e.g., personal office) or locations of interest (e.g., near a landmark in a large space). In one or more embodiments, for each discrete location, a binary classifier is constructed that outputs a score representing the probability that the RSSI scan vector S was observed in that room/location:

$$F_{room}(S) = \Sigma_m \alpha_m h_m(S)$$

In one or more embodiments, each per-room classifier combines "weak learners", $h_m$ according to the scalar weights $\alpha_m$. The weak learners are decision stumps that compare a scalar feature to a threshold $\theta_m$:

$$h_m(s) = \begin{cases} 1 & X_m \geq \theta_m \\ 0 & \text{otherwise} \end{cases}$$

In training, the thresholds $\theta_m$ are tuned to minimize error. The feature vector is defined to consist of elements $X_m$ and is computed from each RSSI vector S below.

In one or more embodiments, given the observed RSSI vectors, the set of unique pairwise differences (margins) between the vectors' elements is computed. For an environment with B total beacons, the resulting margin feature vectors have size $0.5 \cdot B \cdot (B-1)$. Intuitively, these features express coarse order information for the pairs of beacons. The RSSI vector $S \in \mathbb{R}^B$ is transformed into a margin feature vector with elements:

$$X_m = S(a_m) - S(b_m),$$

for $a_m, b_m \in \{1, \ldots, B\}$. Missing RSSI values for specific beacons in the training set are set to a nominal value, $R_{min}$ to indicate they were not visible to the mobile client 102. Thus, the fact that specific beacons 101 are not visible at specific locations is incorporated into the features.

In one or more embodiments, the margin features computed from the training scans form the input to classifier training. Each scalar margin feature corresponds to a weak learner ($h_m$) available for inclusion in any per-room classifier $F_{room}(S)$. The training procedure identifies a location-specific set of weak learners that best discriminates that location from all others. The weak learners and their relative weights ($\alpha_m$ in the equation above) for each per-location classifier are learned in a greedy iterative procedure that optimizes error using a per-sample weighting over the training data, as described, for example in Hastie, T., Tibshirani, R., Friedman, J., The Elements of Statistical Learning, Springer, New York, 2001.

In one or more embodiments, for location determination, a one versus all formulation is used. The estimated room is simply the maximum scoring room among the set of per-room classifiers when applied to a test scan $S_{test}$:

$$\text{room}^*(S_{test}) = \text{argMax}_{room} F_{room}(S_{test})$$

In one or more embodiments, only the required set of RSSI differences that were selected in classifier training are computed. These differences are compared to the thresholds ($\theta_m$) and then combined linearly.

Central Server and Cloud Beacon Agent

In one or more embodiments, the central server 104 performs basic coordination activities between beacons 101, cloud beacon agent(s) 105, client device(s) 102, and anchor device(s) 107. In one or more embodiments, an important role of the central server 104 is to generate and maintain a set of cryptographic keys. These keys are used as part of the proof of location security protocol, discussed in details below. In one exemplary embodiment, at a prescribed interval, a new 16-bit cryptographic key is produced by the central server 104 for each beacon 101. The aforesaid cryptographic keys are distributed by the central server 104 to the cloud beacon agent 105, which in turn, creates a new advertisement profile for each beacon 101 that encodes the 16-bit cryptographic key in the advertisement's Minor ID field. These new advertisement profiles are then pushed to individual beacons 101 when they wake for update. The central server 104 maintains a list of current and recent keys that have been distributed to the beacons 101. The central server 104 also serves as the location proof authority. When a client provides a scan record to the central server 104, it can perform localization using the LCE as well as compare the Minor ID embedded cryptographic keys. In one or more embodiments, a third-party API is also provided by the central server 104. With a unique API access key, external web applications can make REST-style requests for a location of the user device 102.

In one or more embodiments, the basic method of high assurance location estimation is performed as follows: scan data is first collected by a client device 102 and/or anchor device 107 and passed to the central server 104. The scan includes received signal strength (RSSI) measurements from beacons 101 with corresponding hardware IDs, which include per-beacon cryptographic keys previously distributed to the beacons 101 by the cloud beacon agent 105. This scan data is sent to the central server 104 using encryption with a per-client cryptographic key, which is also available to the central server 104. The central server 104 determines the location of the user device 102 based on the received information and returns a location ticket (proof) with the corresponding location information in both cases. The described scheme requires no modification to the beacon hardware, nor any additional client side processing.

Client Device Services

In one or more embodiments, in addition to the end-user application 111, the client device 102 executes two additional services 106 and 103. In one embodiment, the end-user application 111 may be a secure document viewer, which is configured to allow or deny access to a document based on user device's location. In another embodiment, the end-user application 111 may be a secure entry control application configured to open door locks based on user device's location.

In one embodiment, the client location service 103 is responsible for system-level location estimation activities. The client location service 103 periodically captures nearby location advertisements that include the UUID, Major ID, and Minor ID along with a measurement of the received signal strength (RSSI). Once a set of scan records is collected, the client location service 103 provides this information to the location classification engine (LCE). In various embodiments, the LCE can perform classification locally on the client device 102 or send the scan information to a server-based instance of the LCE 109.

In one or more embodiments, the client anchor service 106 handles interaction with the anchor device 107. Primarily, this communication is designed to enable a high-assurance location proof. In one embodiment, this involves the client device 102 initiating a connection with the anchor device 107 using a near field communication channel (for instance NFC for most devices). Over this channel, the anchor device 107 issues a challenge to the client device 102 that must be responded to within a predetermined time window (protocol of this exchange discussed below). In some embodiments, continuous ranging (using BLE) with a cryptographic minor payload (as discussed above) is used in combination with the location services 103 to provide a higher degree of assurance that the client device 102 stays within a close proximity to the anchor device 107.

Anchor Device and Services

In one or more embodiments, the anchor device 107 is a specialized portable computation device. In one exemplary embodiment, it is comprised of an ARM-based computer, such as Raspberry Pi or DragonBoard, well known in the art and available commercially, WIFI®, BLE, NFC communication hardware, simple I/O (LED lights and LED display), and environmental sensors (accelerometer). As discussed in detail below, the anchor device 107 provides many different functions, which are implemented across three primary services. Similar to the client device 102, a location service 108 of the anchor device 107 is responsible for monitoring the location of the anchor device 107. As such, the location service 108 of the anchor device 107 collects the BLE scan information, estimates the location of the anchor device 107 (if done locally), and transmits that information (including the cryptographic minor values) to the central server 104. The anchor services 109 provide local communication services over the BLE protocol for communicating directly with other anchor devices 107, and, in some embodiments, monitoring the proximity of those other anchor devices 107 relative to itself. The corresponding protocol will be described in detail below. Finally, in one or more embodiments, the environmental services 110 use the environmental sensors on the anchor device 107 to monitor and determine when the anchor device 107 has been moved. For instance, in some use cases, detecting such motion ("breaking the anchor") results in the location assurance provided by the anchor device 107 to be revoked.

Trusted Device Management

In one or more embodiments, to increase the trustworthiness of the anchor device 107, existing security features present on the types of ARM-based platforms described above, which are used in implementing the anchor device 107, are leveraged. Specifically, in one embodiment, the anchor device 107 uses a trusted execution environment (TEE) enabled by ARM TrustZone. In an alternative embodiment, the anchor device 107 uses an appropriate firmware, which is available on the DragonBoard. In yet another embodiment, the anchor device 107 uses a discrete TPM, available on Raspberry Pi, to ensure platform integrity and secure storage of cryptographic keys. These technologies allow for the secure generation, storage, and use of cryptographic keys needed by the anchor device 107, thereby preventing the exfiltration of cryptographic material from the anchor device 107. They further enable the use of trusted boot, which provides a cryptographic mechanism for ensuring the integrity of code running on the platform. In the case of the anchor device 107, this would enable assurances that only an unmodified software image of the anchor device 107 could be loaded into the memory of the anchor device 107 to help limit the effects of tampering attacks carried out against the anchor device 107.

Protocols

FIG. 1 discussed above further illustrates the communication paths between all components of the high assurance localization system 100 described herein. Specifically, in this figure, the used protocols are indicated by lines, including communication methods used, which are represented by different line types. As noted in the legend of FIG. 1, four different communication protocols are used: BLUETOOTH® low energy (BLE), inter-process communication on an individual device (IPC), Near field communication (NFC), and Transport layer security (TLS) over WIFI®. Now, the interaction of these system components with one another will be described in detail.

Anchoring the anchor device 107 involves interactions between the anchor device 107, and a secure indoor localization service implemented by the central server 104. In one embodiment, to bind the anchor device 107 to a physical location, the user simply places the anchor device 107 on a flat surface and presses an anchor button on the device.

Figure 3:
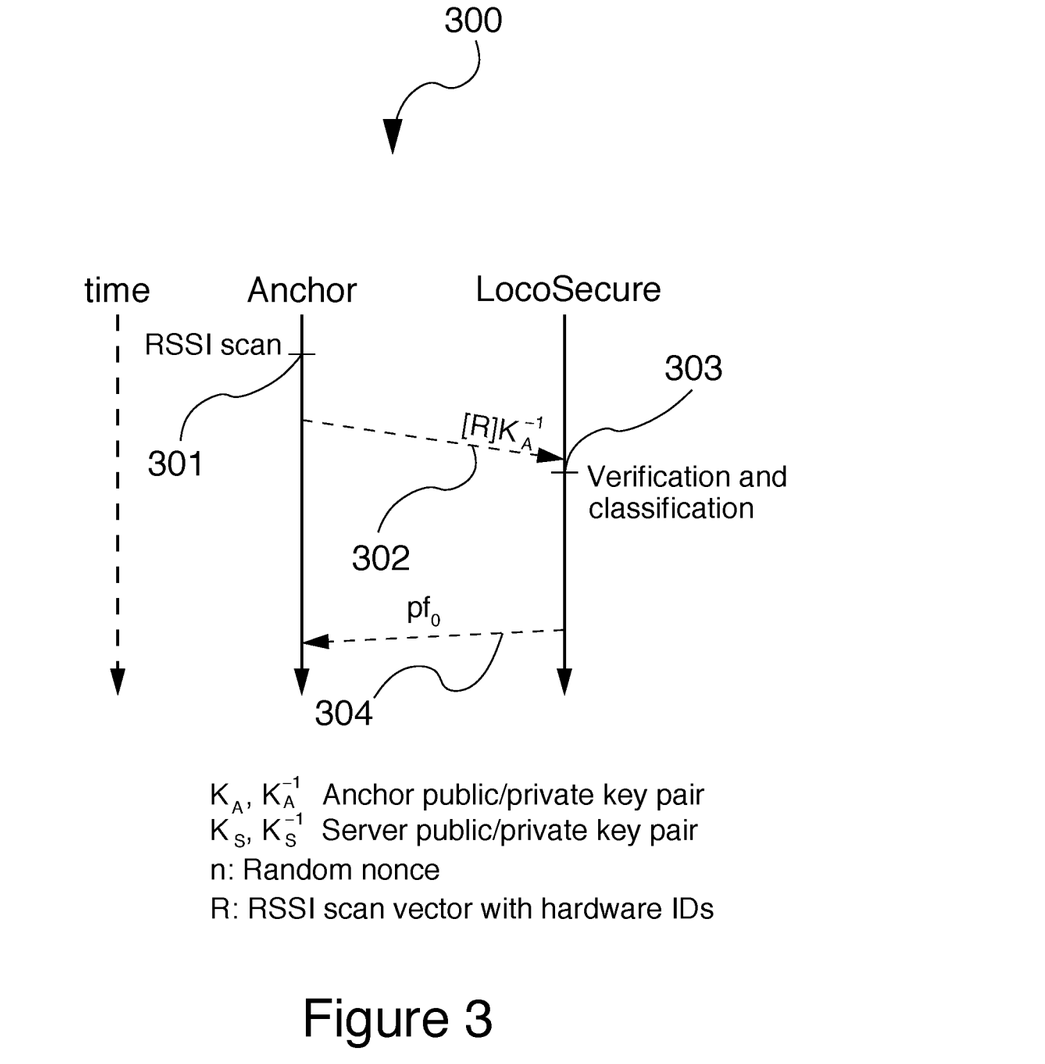
FIG. 3 illustrates an exemplary control flow for establishing a location proof between the anchor device and the secure server.

FIG. 3 illustrates an exemplary control flow 300 for establishing a location proof between the anchor device 107 and the secure server 104. First, at step 301, the anchor device 107 determines its physical location by gathering an RSSI scan dataset from the BLE beacon infrastructure managed by the central server 104. This scan dataset is then digitally signed by the anchor device 107 and passed to the central server 104 over a WIFI®, secured using the TLS protocol, see step 302. The central server 104 verifies the digital signature on the RSSI scan dataset, checks that the rotating cryptographic codes broadcast by the BLE beacon infrastructure are current, classifies the anchor device's 107 location, and generates a digitally signed location proof containing a timestamp, the RSSI scan dataset used, the classified location, and the ID of the anchor device 107, see step 303. The resulting proof is then returned to the anchor device 107 over the existing TLS tunnel, see step 304. At this point, a small LED readout on the side of the device will display the location encoded in the location proof. To accept this location, the user presses the anchor button again, thereby locking the anchor device 107 to this physical location.

At this point, the anchor device 107 is ready to participate in the construction of high-assurance proofs of location. The anchor device 107 also begins an environmental monitoring process in the background that leverages the attached accelerometer to determine whether the anchor device 107 has been moved. If the environmental monitoring procedure detects a motion of the anchor device 107, the anchor device 107 un-anchors itself and invalidates its current location proof. In this state, it cannot assist in the creation of high-assurance location proof until the anchor device 107 is again anchored. In one or more embodiments, the anchor device 107 stores appropriate motion threshold(s) for determining if the current location proof should be invalidated, in the event the detected motion parameters(s) exceed such stored threshold(s).

Figure 4:
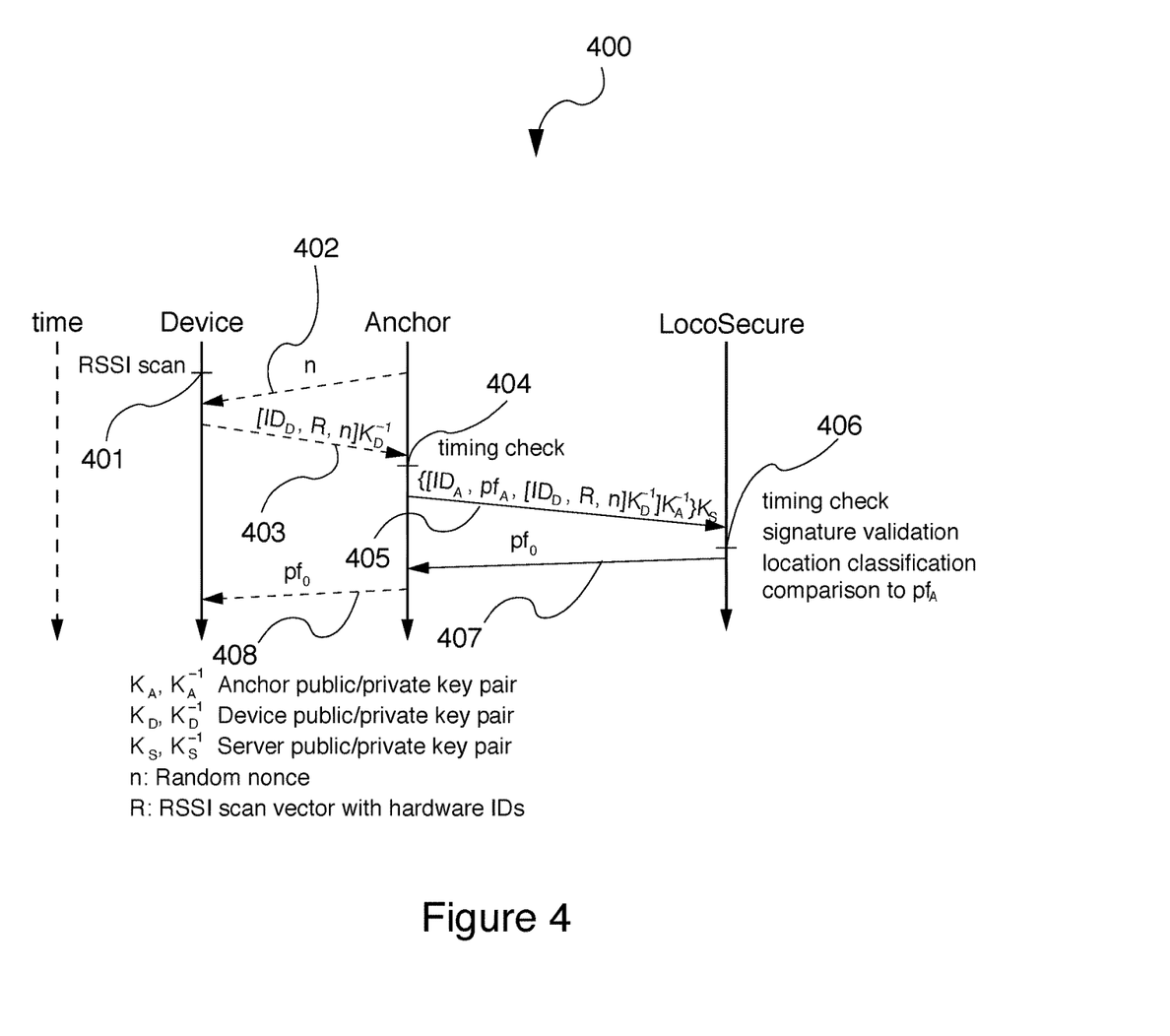
FIG. 4 illustrates an exemplary overall control flow for establishing a high assurance location proof.

The initial construction of the high-assurance proofs of location will now be described. FIG. 4 illustrates an exemplary overall control flow 400 for establishing a high assurance location proof. In one or more embodiments, to create a high-assurance proof of authorization, the mobile device 102 may first leverage its location services framework to gather an RSSI scan dataset from the BLE beacons 101, see step 401. This device 102 is then placed upon an anchored anchor device 107 to enable NFC communication between the aforesaid two devices. The anchor services module 109 within the anchor device 107 generates a random number (n)

(server nonce) and transfers it to the anchor services module 106 of the mobile device 102 via NFC, see step 402. The mobile device 102 then creates a digitally-signed message containing a unique identifier for the device (IDD), the RSSI scan dataset (R), and the server nonce (n). This message is then returned to the anchor device 107 via NFC, see step 403.

To complete the high assurance proof construction process, the anchor device 107 first performs timing check at step 404, to verify that the time lapsed from the sending of the random number (n) in step 402 to the receiving of the aforesaid digitally-signed message in step 403 does not exceed a predetermined threshold to prevent spoofing. In addition, the nonce (n) received from the mobile device 102 in the aforesaid digitally-signed message may be verified. If the timing check is successful, the anchor device 107 subsequently digitally signs a message containing its unique identifies (IDA), the location proof that it obtained during the anchoring process (pfA), and the digitally-signed message generated by the client device 102 ([IDD, R, n]KD-1). This message is then transferred to the central server 104 via TLS, see step 405. Prior to generating a location proof for the mobile device 102, the central server 104 verifies that pfA is still valid, verifies that the mobile device 102 and anchor device 107 digital signatures are correct, classifies the device location from the RSSI dataset, and ensures that this classified location matches the location in pfA, se step 406. In addition, the nonce (n) received from the mobile device 102 in the aforesaid digitally-signed message may be verified. If all of these checks succeed, the central server 104 issues a location proof for the mobile device 102 (pfD) that is returned to the anchor device 107 via TLS, see step 407, and subsequently forwarded by the anchor device 407 to the mobile device 102 over NFC.

As would be appreciated by persons of ordinary skill in the art, the near-field nature of NFC ensures that the mobile device 102 is co-resident with the anchor device 107 when constructing its proof of authorization. To mitigate the threat of attacks in which multiple parties collude to produce a location proof for an off-site attacker, the anchor device 107 enforces tight timing constraints on the first message exchange in FIG. 4, see step 404. Forwarding the nonce n to a colluding party via WIFI® or BLE and waiting for a response containing a signature would violate these timing constraints, causing the anchor device 107 to halt the protocol upon detecting unreasonable delays. Furthermore, the signatures of the client device 102 and the anchor device 107 on the third message of the protocol allow the central server 104 to ensure that the client device 102 and the anchor device 107 are actively cooperating in the construction of this proof. Specifically, the second message (which is signed by the client device 102) is embedded in the third message (which is signed by the anchor device 107), linking these messages to a single execution of the protocol. Finally, the cryptographic codes in the scan dataset, the anchor device 107 nonce n, and the timestamp on pfA allow for a check on the freshness of the process itself, preventing replay-style attacks.

In one or more embodiments, optionally, location proofs created with the assistance of the anchor device 107, can be subjected to continuous monitoring in one of two ways. First, location-enabled applications running on the client device 102 or in other cloud services can register callbacks (via TLS) with the central server 104 to be notified when the mobile device 102 diverges from the location specified in its high-assurance proof, pfD.

Figure 5:
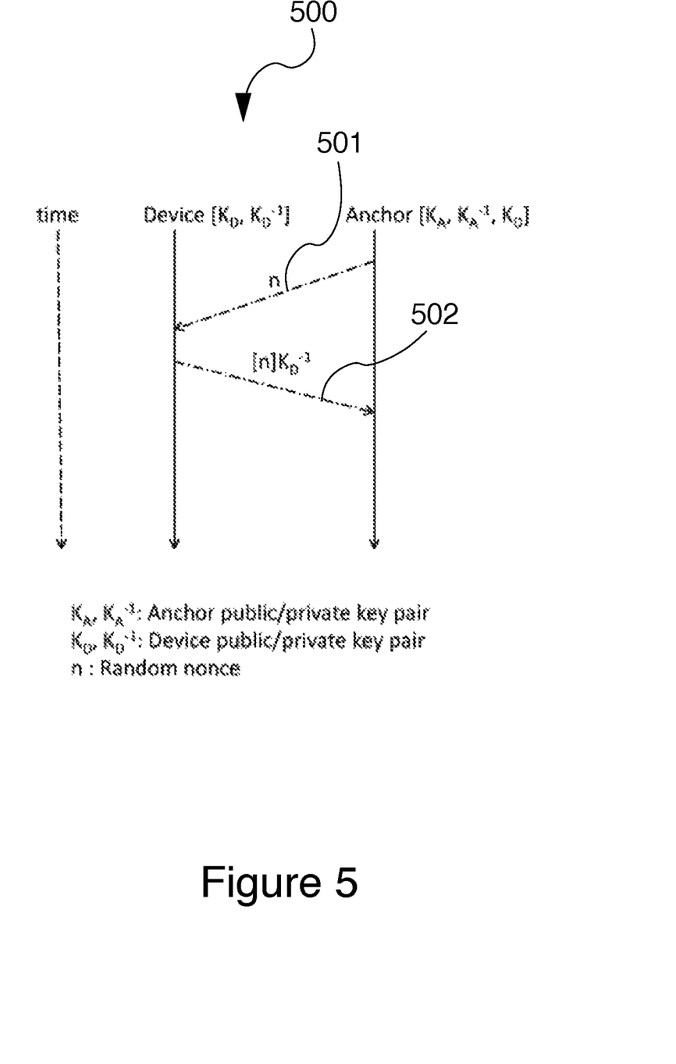
FIG. 5 illustrates an exemplary control flow for (optional) BLE proximity checking with client device.

Second, the anchor device 107 itself can play an active role in monitoring the location of nearby mobile devices 102. FIG. 5 illustrates an exemplary control flow 500 for (optional) BLE proximity checking with client device 102. As shown in FIG. 5, BLE channel can be used to poll mobile devices 102 using a low-power signal to ensure that they remain within close proximity to the anchor device 107 (of which the hardware is controlled, trusted, and specifically configured). To ensure specific transmit power, a separate daughter BLE board could be used with firmware and/or physical antenna limitations to transmit at a low power (e.g., −20 dBm, with a receiving distance of approximately 1 meter would be limited to −115 dBm signal). At a configurable time interval, the anchor device 107 will use BLE to send a message identifying a particular device and providing it with a random challenge, see step 501 in FIG. 5. The mobile device 102 will then respond via BLE with a digital signature over that challenge, acknowledging that it was within close enough proximity to receive the challenge, see step 502. Failure to respond to these challenges will trigger the anchor device 107 to contact the central server 104 to revoke the non-answering mobile device's 102 high assurance location proof. Similarly, if the accelerometer attached to the anchor device 107 detects that the anchor device 107 is being moved, it can be configured to revoke all high-assurance location proofs that were issued since it was anchored.

In one or more embodiments, a digitally-signed response 502 to the random challenge issued by the anchor device 107 ensures that some mobile device 102 was close enough to the anchor device 107 to hear the range-limited BLE transmission. Similar to the NFC protocol described above, restrictions on round-trip time for receiving this response mitigate the chance that a rogue mobile device 102 could forward the challenge to an out-of-range party to generate the signature.

In one or more embodiments, the high-assurance proofs of location may be further assisted using periodic or event-based triggers. In situations where environmental monitoring is not enough, applications 111 can request that user devices 102 refresh their high-assurance location proofs explicitly in either a periodic or event-driven manner. When an application 111 determines that a proof needs to be refreshed, it can request a new high-assurance proof from the location services module 103 of the mobile device 102. This will raise an alert on the mobile device 102, asking the user to engage the anchor device 107 in the protocol described in FIG. 4. In one or more embodiments, successful completion of this protocol will produce an updated high-assurance location proof, which will be returned to the location services 103 on the mobile device 102 and made available for consumption by the requesting application 111.

Exemplary Use Cases and Applications

The description below provides several examples of how the described system 100 would be used by end-users in support of specific scenarios of uses. Each of the scenarios described begins with the anchoring of the anchor device 107 to a physical location, which is performed as follows. Specifically, to bind the anchor device 107 to a physical location, the user simply places the anchor device 107 on a flat surface and presses an anchor button on the anchor device 107. First, the device determines its physical location as described above. In one embodiment, a small LED readout on the side of the anchor device 107 will subsequently display the location determined by the localization service 108. To accept this location, the user presses the anchor button again, thereby locking the anchor device 107 to this physical location. At this point, the anchor device 107 is ready to participate in the construction of high-assurance proofs of location.

Scenario 1: Initial Localization Only. Many times, it may be the case that a high-assurance location proof is only requested at the start of a location-aware computing session (e.g., to enable access to sensitive resources), and lower-assurance proofs of location can be used for the purpose of continuous location tracking, revoking access if the device is found to drift from the location of the high-assurance proof. In this situation, it may be the case that administrative personnel bring in the anchor device 107 to start a work session, the device is anchored, and users leverage the device to bootstrap high-assurance location proofs. At this point, the administrative personnel can leave with the anchor device 107, and users can continue their work until they leave the location.

Scenario 2: Ongoing Monitoring. The anchor device 107 can also play a more active role in the monitoring of user location after the initial high-assurance proof is created by closely monitoring its environment. Should any device move more than a few meters from the anchor device 107, their high-assurance proof can be revoked by a cooperative action taken by the anchor device 107 and the central server 104. Further, if the anchor device 107, itself, determines that it is being moved, it can revoke all of the high-assurance proofs that it has helped create since the time that it was last anchored.

Scenario 3: Periodic or Event-based Triggers. There may be times at which an application requires the user to refresh their high-assurance location proof by placing their mobile device 102 on the anchor device 107, and re-running the localization protocol. In various embodiments, this can be enabled via coordination between applications 111 running on the mobile device 102 and the anchor device 107, through a cloud services API, and these triggers may be set periodically (e.g., once per hour) or in an event-driven manner (e.g., upon sensitive resource request).

Scenario 4: Digital Notary. The central server 104, and by extension the anchor device 107, provides a mechanism though which trusted location- and time-stamps can be created as described above. To this end, in various embodiments, the anchor device 107 can be used to coordinate the creation of bindings between multiple users' mobile devices 102, a physical location, a time, and some item of content, such as a document. This, effectively, can provide a high-assurance digital notary that can be used by a variety of applications.

Computing Platforms

Figure 6:
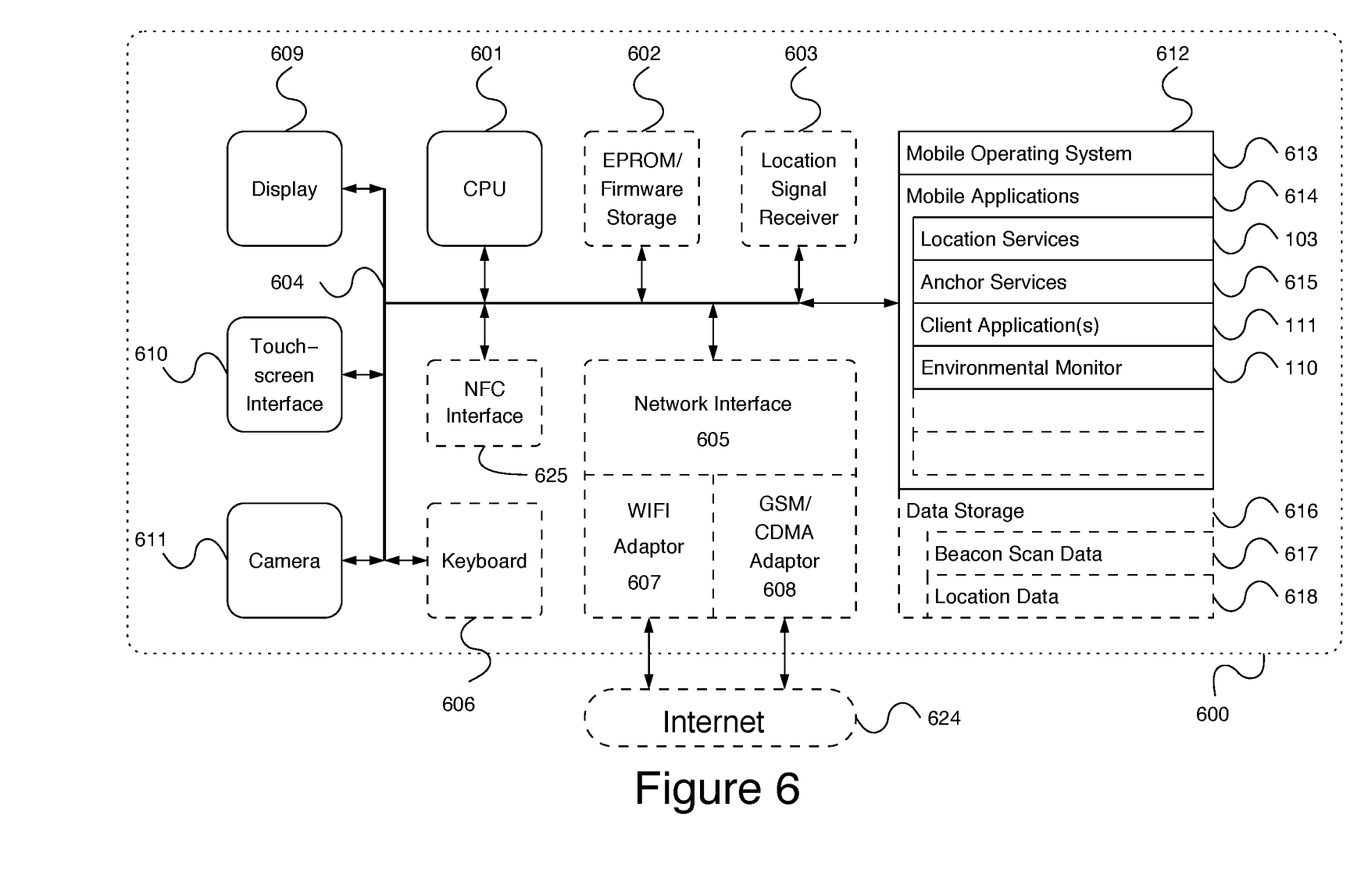
FIG. 6 illustrates an exemplary embodiment of a computerized mobile system that could be used as the client device or anchor device in connection with the localization system illustrated in FIG. 1.

FIG. 6 illustrates an exemplary embodiment of a computerized mobile system 600 that could be used as the mobile client device 102 in connection with the localization system 100 illustrated in FIG. 1. In one or more embodiments, the computerized mobile system 600 may be implemented within a form factor of a mobile computing device, such as a smartphone, a personal digital assistant (PDA), a tablet computer, or a smart watch, all of which are widely available commercially and are well known to persons of skill in the art.

The computerized system 600 may include a data bus 604 or other interconnect or communication mechanism for communicating information across and among various hardware components of the mobile computerized system 600, and a central processing unit (CPU or simply processor) 601 coupled with the data bus 604 for processing information and performing other computational and control tasks. Computerized system 600 also includes a memory 612, such as a random access memory (RAM) or other dynamic storage device, coupled to the data bus 604 for storing various information as well as instructions to be executed by the processor 601. The memory 612 may also include persistent storage devices, such as a magnetic disk, optical disk, solid-state flash memory device or other non-volatile solid-state storage devices.

In one or more embodiments, the memory 612 may also be used for storing temporary variables or other intermediate information during execution of instructions by the processor 601. Optionally, computerized system 600 may further include a read only memory (ROM or EPROM) 602 or other static storage device coupled to the data bus 604 for storing static information and instructions for the processor 601, such as firmware necessary for the operation of the computerized system 600, basic input-output system (BIOS), as well as various configuration parameters of the computerized system 600.

In one or more embodiments, the computerized system 600 may incorporate a display device 609, which may be also coupled to the data bus 604, for displaying various information to a user of the computerized system 600. In an alternative embodiment, the display device 609 may be associated with a graphics controller and/or graphics processor (not shown). The display device 609 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 609 may be incorporated into the same general enclosure with the remaining components of the computerized system 600. In an alternative embodiment, the display device 609 may be positioned outside of such enclosure.

In one or more embodiments, the computerized system 600 may further incorporate an near field communication (NFC) interface 625 connected to the data bus 604 and configured to communicate with one or more NFC devices in the building as described above.

In one or more embodiments, the computerized system 600 may incorporate one or more input devices, such as a touchscreen interface 610 for receiving tactile commands, a camera 611 for acquiring still images and video of various objects, such as user's faces or room surroundings, as well as a keyboard 606, which all may be coupled to the aforesaid data bus 604 for communicating information, including, without limitation, images and video, as well as user command selections to the processor 601. In an alternative embodiment, input devices may include a system for tracking eye movements of the user (not shown), which may be used to indicate to the computerized system 600 the command selection by the user.

In one or more embodiments, the computerized system 600 may additionally include a location signal receiver 603 configured to perform scan for beacons 101 and supply scan data described above to the processor 601 via the data bus 604.

In one or more embodiments, the computerized system 600 may additionally include a communication interface, such as a network interface 605 coupled to the data bus 604. The network interface 605 may be configured to establish a connection between the computerized system 600 and the Internet 624 using at least one of WIFI interface 607 and the cellular network (GSM or CDMA) adaptor 608. The network interface 605 may be configured to provide a two-way data communication between the computerized system 600 and the Internet 624. The WIFI interface 607 may operate in compliance with 802.11a, 802.11b, 802.11g and/or 802.11n protocols as well as BLUETOOTH® protocol well known to persons of ordinary skill in the art. In an exemplary implementation, the WIFI interface 607 and the cellular network (GSM or CDMA) adaptor 608 send and receive electrical or electromagnetic signals that carry digital data streams representing various types of information. For example, the aforesaid networking components may be used to establish a network data connection between the computerized system 600 and other components of the localization system 100, such as the central server 104 and third party services/applications 108.

In one or more embodiments, the Internet 624 typically provides data communication through one or more sub-networks to other network resources. Thus, the computerized system 600 is capable of accessing a variety of network resources located anywhere on the Internet 624, such as web servers, other content servers as well as other network data storage resources. In one or more embodiments, the computerized system 600 is configured send and receive messages, media and other data, including application program code, through a variety of network(s) including Internet 624 by means of the network interface 605. In the Internet example, when the computerized system 600 acts as a network client, it may request code or data for an application program executing on the computerized system 600. Similarly, it may send various data or computer code to other network resources.

In one or more embodiments, the computerized system 600 uses the network interface 605 to send request(s), via the Internet 624, such as HTTP requests, to the central server 104 and receive various information, including, without limitation, the aforesaid location information and the timestamp, therefrom.

In one or more embodiments, the functionality described herein is implemented by computerized system 600 in response to processor 601 executing one or more sequences of one or more instructions contained in the memory 612. Such instructions may be read into the memory 612 from another computer-readable medium. Execution of the sequences of instructions contained in the memory 612 causes the processor 601 to perform the various process steps described herein. In alternative embodiments, hard-wired circuitry may be used in place of or in combination with software instructions to implement the embodiments of the invention. Thus, embodiments of the invention are not limited to any specific combination of hardware circuitry and software.

The term "computer-readable medium" as used herein refers to any medium that participates in providing instructions to processor 601 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 601 for execution. For example, the instructions may initially be carried on a magnetic disk from a remote computer. Alternatively, a remote computer can load the instructions into its dynamic memory and send the instructions over the Internet 624. Specifically, the computer instructions may be downloaded into the memory 612 of the computerized system 600 from the foresaid remote computer via the Internet 624 using a variety of network data communication protocols well known in the art.

In one or more embodiments, the memory 612 of the computerized system 600 may store any of the following software programs, applications or modules:

1. Operating system (OS) 613, which may be a mobile operating system for implementing basic system services and managing various hardware components of the computerized system 600. Exemplary embodiments of the operating system 613 are well known to persons of skill in the art, and may include any now known or later developed mobile operating systems.

2. Mobile applications 614 may include, for example, a set of software applications executed by the processor 601 of the computerized system 600, which cause the computerized mobile system 600 to perform certain predetermined functions, such as receive the beacon signals as described above. In one or more embodiments, the mobile applications 614 may include, for example, the location services 103, anchor services 615 (which could be either anchor services 109 or 106), environmental monitor 110 as well as one or more client applications 111, see FIG. 1.

3. Data storage 616 may be used, for example, for storing the bacon scan data 617 as well as location data 618 of the computerized mobile system 600.

Figure 7:
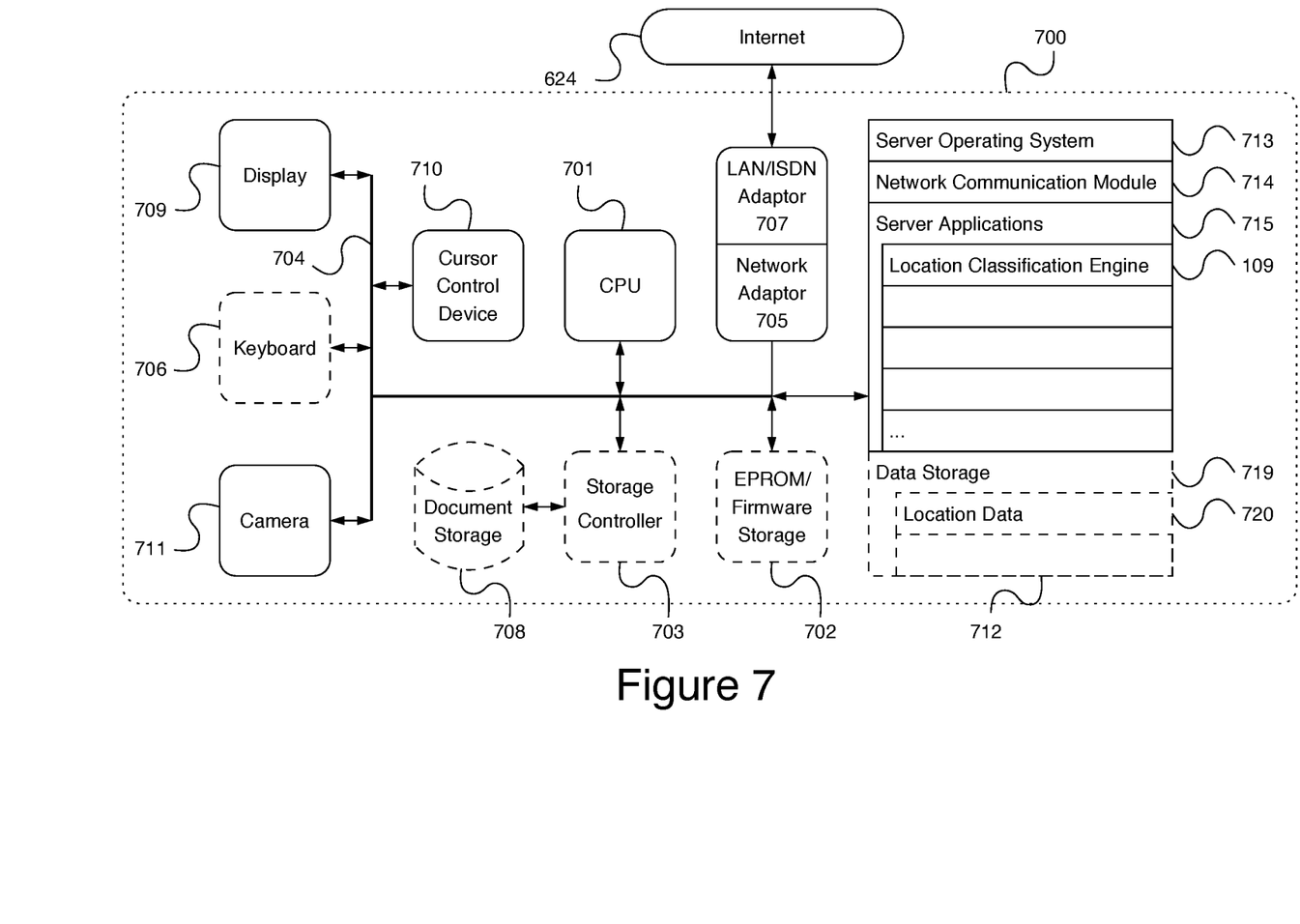
FIG. 7 illustrates an exemplary embodiment of a computerized server system, which could be used, for example, as the central server of the localization system shown in FIG. 1.

FIG. 7 illustrates an exemplary embodiment of a computerized server system 700 which could be used, for example, as the central server 104 of the localization system 100 shown in FIG. 1. It should be noted that other components of the localization system 100, including, without limitation, the cloud beacon agent 105, may be also deployed based on the computerized server system 700.

In one or more embodiments, the computerized server system 700 may incorporate a data bus 704, which may be substantially similar and may perform substantially similar functions as the data bus 704 of the computerized system 600 illustrated in FIG. 9. In various embodiments, the data bus 704 may use the same or different interconnect and/or communication protocol as the data bus 604. The one or more processors (CPUs) 701, the network adaptor 705, the EPROM/Firmware storage 702, the display device 709 and the keyboard 706 of the computerized server system 700 may be likewise substantially similar to the respective processor 601, the network interface 605, the EPROM/Firmware storage 602, the display device 609 and the keyboard 606 of the computerized system 600, except that the former components are deployed in a server platform configuration. In various implementations, the one or more processor 701 may have substantially increased processing power as compared with the processor 601.

In addition to the input device 706 (keyboard), the computerized server system 700 may additionally include a cursor control device 710, such as a mouse, a trackball, or cursor direction keys for communicating direction information and command selections to processor 701 and for controlling cursor movement on the display device 709. This input device typically has two degrees of freedom in two axes, a first axis (e.g., x) and a second axis (e.g., y), that allows the device to specify positions in a plane.

The LAN/ISDN adaptor 707 of the computerized server system 700 may be implemented, for example, using an integrated services digital network (ISDN) card or a modem to provide a data communication connection to a corresponding type of telephone line, which is interfaced with the Internet 624 using Internet service provider's hardware (not shown). As another example, the LAN/ISDN adaptor 707 may be a local area network interface card (LAN NIC) to provide a data communication connection to a compatible LAN and the Internet 624. To store various media files, the computerized server system 700 may be provided with document storage 708, for storing various content to be displayed to the user by means of a storage controller 703. The camera 711 may be used to acquire images and/or video of various objects.

In one or more embodiments, the memory 712 of the computerized server system 700 may store any of the following software programs, applications, modules and/or data:

1. A server operating system (OS) 713, which may be an operating system for implementing basic system services and managing various hardware components of the computerized server system 700. Exemplary embodiments of the server operating system 713 are all well known to persons of skill in the art, and may include any now known or later developed operating systems.

2. A network communication module 714 may incorporate, for example, one or more network protocol stacks which are used to establish a networking connection between the computerized server system 700 and the various network entities of the Internet 624, such as the computerized mobile system 600, using the network adaptor 705 working in conjunction with the LAN/ISDN adaptor 707.

3. Server applications 715 may include, for example, a set of software applications executed by one or more processors 701 of the computerized server system 700, which cause the computerized server system 700 to perform certain predetermined functions or tasks. In one or more embodiments, the server applications 715 may include the location classification engine 109.

4. Data storage 719 may be used, for example, for storing the location data 720, described above, which may be stored in a form of database tables.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in various localization systems and methods. It is intended that the specification and examples be considered as exemplary only, with a true scope and spirit of the invention being indicated by the following claims.

What is claimed is:

1. A computer-implemented method for location verification, the method being performed in a computerized system comprising a central processing unit, a localization signal receiver and a memory, the computer-implemented method comprising:
   receiving at least one localization signal using the localization signal receiver;
   measuring a strength of the received localization signal;
   receiving, by the computerized system, a first message comprising a key from an anchor device;
   transmitting a second message comprising at least the received key back to the anchor device;
   analyzing, at the anchor device, a timing of the first message in relation to a timing of the second message;
   transmitting, by the anchor device, a third message to a server, the third message comprising at least the second message and a location proof of the anchor device obtained by the anchor device prior to said receiving of the first message;
   determining, by the server, whether the computerized system is co-located with the anchor device based on the third message, the anchor device being in a direct communication with a server;
   when the computerized system is determined to be co-located with the anchor device, determining, by the server a location based at least on the measured strength of the received localization signal; and
   transmitting, by the server, a location proof of the computerized system to the anchor device and then transmitting the location proof of the computerized system to the computerized system by the anchor device, wherein the location proof of the anchor device is based on anchoring the anchor device based on a first location of the anchor device prior to receiving said first message from the computerized system,
   wherein the computer-implemented method further comprises:
   detecting motion of the anchor device by an accelerometer coupled to the anchor device;
   invalidating the location proof of the anchor device in response to the detected motion; and
   after invalidating the location proof of the anchor device, anchoring the anchor device to a second location based on the detected motion,
   wherein anchoring the anchor device to the second location comprises:
   receiving, at the anchor device, at least one second localization signal by a beacon infrastructure managed by the server;
   measuring, by the anchor device, a strength of the received second localization signal;
   determining, by the server, the second location of the anchor device based at least on the measured strength of the received localization signal; and
   transmitting a new location proof of the anchor device to the anchor device by the server.

2. The computer-implemented method of claim 1, wherein the computerized system is determined to be co-located with the anchor device when a time lapsed between the first message and the second message does not exceed a predetermined threshold.

3. The computer-implemented method of claim 1, wherein the key is a randomly generated nonce.

4. The computer-implemented method of claim 1, wherein the second message is signed using a private cryptographic key associated with the computerized system and wherein the anchor device validates the second message using a public key associated with the computerized system.

5. The computer-implemented method of claim 1, wherein receiving the first message and transmitting the second message are performed via a near field communication (NFC) protocol.

6. The computer-implemented method of claim 1, wherein the second message further comprises a value of the measured strength of the received localization signal.

7. The computer-implemented method of claim 1, wherein the third message is signed using a private cryptographic key associated with the anchor device and wherein the server validates the third message using a public key associated with the anchor device.

8. The computer-implemented method of claim 1, wherein the key is unique.

9. The computer-implemented method of claim 1, wherein the received localization signal is provided by a beacon disposed in a room of a building.

10. The computer-implemented method of claim 1, wherein the anchor device is a trusted device comprising a trusted execution environment.

11. The computer-implemented method of claim 1, wherein the computerized system executes a user application and wherein the location proof of the computerized system is provided to the user application.

12. The computer-implemented method of claim 1, further comprising, prior to said receiving of the first message, anchoring the anchor device.

13. The computer-implemented method of claim 12, wherein anchoring the anchor device on the first location comprises receiving, at the anchor device, at least one first localization signal; measuring a strength of the received first localization signal and determining a location of the anchor device based at least on the measured strength of the received first localization signal.

14. The computer-implemented method of claim 13, wherein the determining the first location of the anchor device based at least on the measured strength of the received first localization signal is performed on the server and wherein the server is configured to transmit the location proof of the anchor device to the anchor device prior to said receiving of the first message.

15. The computer-implemented method of claim 1, wherein the anchor device comprises an accelerometer and wherein the motion of the anchor device is detected using the accelerometer.

16. The computer-implemented method of claim 1, wherein the location proof of the anchor device is invalidated when the detected motion exceeds a predetermined threshold.

17. The computer-implemented method of claim 1, wherein determining whether the computerized system is co-located with an anchor device is performed periodically.

18. A non-transitory computer-readable medium embodying a set of computer-executable instructions, which, when executed in connection with a computerized system comprising a central processing unit, a localization signal receiver, a display and a memory, cause the computerized system to perform a location verification method comprising:
    receiving at least one localization signal using the localization signal receiver;
    measuring a strength of the received localization signal;
    receiving, by the computerized system, a first message comprising a key from an anchor device;
    transmitting a second message comprising at least the received key back to the anchor device;
    analyzing, at the anchor device, a timing of the first message in relation to a timing of the second message;
    transmitting, by the anchor device, a third message to a server, the third message comprising at least the second message and a location proof of the anchor device obtained by the anchor device prior to said receiving of the first message;
    determining, by the server, whether the computerized system is co-located with the anchor device based on the third message, the anchor device being in a direct communication with a server;
    when the computerized system is determined to be co-located with the anchor device, determining, by the server a location based at least on the measured strength of the received localization signal; and
    transmitting, by the server, a location proof of the computerized system to the anchor device and then transmitting the location proof of the computerized system to the computerized system by the anchor device, wherein the location proof of the anchor device is based on anchoring the anchor device based on a first location of the anchor device prior to receiving said first message from the computerized system,
    wherein the method further comprises:
    detecting motion of the anchor device by an accelerometer coupled to the anchor device;
    invalidating the location proof of the anchor device in response to the detected motion, and
    after invalidating the location proof of the anchor device, anchoring the anchor device to a second location based on the detected motion,
    wherein anchoring the anchor device to the second location comprises:
    receiving, at the anchor device, at least one second localization signal by a beacon infrastructure managed by the server;
    measuring, by the anchor device, a strength of the received second localization signal,
    determining, by the server, the second location of the anchor device based at least on the measured strength of the received localization signal; and
    transmitting a new location proof of the anchor device to the anchor device by the server.

19. A computerized system comprising a central processing unit, a localization signal receiver and a memory, the memory storing a set of computer-readable instructions causing the computerized system to perform a location verification method comprising:
    receiving at least one localization signal using the localization signal receiver;
    measuring a strength of the received localization signal;
    receiving, by the computerized system, a first message comprising a key from an anchor device;
    transmitting a second message comprising at least the received key back to the anchor device; analyzing, at the anchor device, a timing of the first message in relation to a timing of the second message;

transmitting, by the anchor device, a third message to a server, the third message comprising at least the second message and a location proof of the anchor device obtained by the anchor device prior to said receiving of the first message;

determining, by the server, whether the computerized system is co-located with the anchor device based on the third message, the anchor device being in a direct communication with a server;

when the computerized system is determined to be co-located with the anchor device, determining, by the server a location based at least on the measured strength of the received localization signal; and transmitting, by the server, a location proof of the computerized system to the anchor device and then transmitting the location proof of the computerized system to the computerized system by the anchor device, wherein the location proof of the anchor device is based on anchoring the anchor device based on a first location of the anchor device prior to receiving said first message from the computerized system, wherein the method further comprises:

detecting motion of the anchor device by an accelerometer coupled to the anchor device;

invalidating the location proof of the anchor device in response to the detected motion; and after invalidating the location proof of the anchor device, anchoring the anchor device to a second location based on the detected motion, wherein anchoring the anchor device to the second location comprises:

receiving, at the anchor device, at least one second localization signal by a beacon infrastructure managed by the server;

measuring, by the anchor device, a strength of the received second localization signal;

determining, by the server, the second location of the anchor device based at least on the measured strength of the received localization signal; and transmitting a new location proof of the anchor device to the anchor device by the server.

* * * * *